United States Patent [19]

Fleenor, Jr.

[11] 4,253,972

[45] Mar. 3, 1981

[54] FLAME RETARDANT POLYOLEFINS

[75] Inventor: Clifton T. Fleenor, Jr., Parkersburg, W. Va.

[73] Assignee: Borg-Warner Corporation, Chicago, Ill.

[21] Appl. No.: 80,765

[22] Filed: Oct. 1, 1979

[51] Int. Cl.³ .......................... C09K 3/28; C08J 9/00
[52] U.S. Cl. ............................ 252/8.1; 260/45.8 NT; 260/927 R
[58] Field of Search .................... 106/18.18, 18.21; 252/8.1; 260/45.8 NT, 45.9 NP, 927 R

[56] References Cited

U.S. PATENT DOCUMENTS

| | | | |
|---|---|---|---|
| 4,028,333 | 6/1977 | Lindvay | 260/45.8 NT |
| 4,154,930 | 5/1979 | Halpern | 260/45.8 NT |
| 4,201,705 | 5/1980 | Halpern et al. | 260/45.8 NT |

Primary Examiner—Leland A. Sebastian
Attorney, Agent, or Firm—Richard J. Schlott

[57] ABSTRACT

The addition of a polyhydric alcohol to compositions comprising a polyolefin and a pentate salt of an amino-s-triazine improves the intumescent behavior and flame retardant characteristics thereof.

14 Claims, No Drawings

FLAME RETARDANT POLYOLEFINS

BACKGROUND OF THE INVENTION

This invention relates to flame retardant polyolefin compositions. More particularly, this invention relates to flame retardant polyolefin compositions comprising a polyolefin, a flame retarding amount of the pentate salt of an amino-s-triazine and a polyhydric alcohol, and to a method for rendering polyolefins flame retardant.

Polyolefins are difficult to render flame retardant. A number of halogen-containing flame retardants are known which, when compounded with polyolefins, provide non-burning compositions, i.e. materials which do not propagate flame. However, polyolefins such as polypropylene have a tendency toward dripping flaming drops which is quite difficult to overcome, and such non-burning compositions generally are not capable of being made fully self-extinguishing.

An alternative approach is to incorporate char-forming additives which, in the presence of flame, form a thick, non-flammable insulating barrier to protect the substrate polymer. One such intumescent or char-forming system, disclosed in U.S. Pat. No. 3,936,416, employs a combination of melamine pyrophosphate and a polyol. This additive combination is effective in providing a non-burning, non-dripping polypropylene composition. Preparation and compounding with these materials can be difficult. During preparation, the additive combination must be degassed in order to avoid foaming during the compounding with polypropylene and/or in subsequent molding operations. In addition, the additive as obtained has a substantial tan or brown color which imparts an undesirable hue to the polypropylene compositions, and the additive is obtained as a hard, solid mass which is pulverized with some difficulty for compounding.

The pentate salts of amino-s-triazines are effective intumescent flame retardant additives for polyolefins, providing compositions that are self-extinguishing, intumescent and non-dripping. The additives are dry, white, powdery solids and are readily compounded with polyolefins to provide compositions which have excellent color and which are readily processed without apparent foaming or decomposition. The preparation of these compounds is disclosed in U.S. Pat. No. 4,154,930, and their use in polyolefin compositions is disclosed in U.S. patent application Ser. No. 937,343, filed Aug. 28, 1978, now U.S. Pat. No. 4,201,705.

SUMMARY OF THE INVENTION

The effectiveness of pentate salts of amino-s-triazines as flame retardant additives for polyolefins is enhanced by the addition of a polyhydric alcohol. The including of polyhydric alcohols in compositions comprising a polyolefin and a pentate salt of an amino-s-triazine increases the intumescing and char-forming action of the pentate salt, and provides highly flame retardant compositions at reduced additive levels.

DETAILED DESCRIPTION OF THE INVENTION

The flame retardant polyolefin compositions of this invention comprise an olefin homopolymer or copolymer, a pentate salt of an amino-s-triazine and a polyhydric alcohol.

The polyolefins useful for the purposes of this invention are polymers of alpha-olefins, such as ethylene, propylene, isobutylene, butene-1 and the like, and copolymers thereof. Homopolymers and copolymers of polyolefins are commercially available in a wide range of molecular weights and densities, and in general all will be useful for forming the flame retardant compositions of this invention.

The pentate salts of amino-s-triazines useful for the purposes of this invention are pentaerythritol diphosphate salts (pentates) having the following structure:

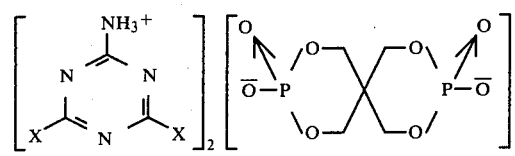

wherein x may be $-NH_2$ or $-OH$, and include melammonium pentate, ($x=-NH_2$), the pentate salt of ammelide ($x=OH$), and mixtures thereof.

The pentate salts of amino-s-triazines are readily prepared by first hydrolyzing a pentate compound such as dichloropentate to provide the free acid, then reacting that product with the requisite amount of the amino-s-triazine to form the sparingly soluble salt. For example, the dichloropentate is first hydrolyzed by warming with aqueous alkali. This product is then added to a warm aqueous solution of the amino-s-triazine containing sufficient mineral acid to dissolve the triazine. The sparingly soluble pentate salt precipitates from the solution as a fine powder or crystalline compound. As an alternative, an acid acceptor such as a tertiary alkyl amine may be employed in place of the alkali to promote the hydrolysis reaction. As a third alternative, the amino-s-triazine may be added to the aqueous mixture prior to hydrolysis, whereupon the pentate salt is formed and precipitates as the hydrolysis proceeds. The preparation of pentate salts of amino-s-triazines is more fully described in U.S. Pat. No. 4,154,930, issued May 15, 1979.

The polyhydric alcohols useful for the purposes of this invention are acyclic and cyclic compounds having a plurality of hydroxyl groups attached thereto, and include, for example, pentaerythritol, dipentaerythritol tripentaerythritol, pentitols such as adonitol, arabitol and the like, hexitols such as dulcitol, inositol and the like, and saccharides such as amylose, xylan and the like, as well as such derivatives thereof as N-methyl glucamine. The function of the polyhydric alcohol appears to be that of acting as an additional carbonific or carbon source for the amino-s-triazine pentate intumescent additive thereby increasing the amount of char formation and reducing the amount of intumescent additive required to effect useful flame retardant behavior. The amount of polyhydric alcohol employed will thus necessarily be selected in proportion to the amount of amino-s-triazine pentate used, and in general the weight ratio of amino-s-triazine pentate to polyhydric alcohol will be from about 9:1 to about 5:1. Where lesser amounts of polyhydric alcohol are employed such that the ratio is greater than about 10:1, the improvement in char formation becomes negligible, while the use of greater amounts of polyhydric alcohol, i.e. where the ratio is less than about 4:1, tends to reduce the flame retardant effect by way of supplying the unneeded excess polyhydric alcohol as a fuel to the flame.

The compounding of the polyolefin with the flame retardant pentate salt may be carried out in any of the conventional compounding processes including Banbury mixing, melt extrusion and the like.

The following Examples are provided to illustrate the practice of the invention.

In the following formulations, Tables I, II and IV, all proportions are in parts by weight.

TABLE II-continued

| Example Numbers | 6 | 7 | 8 | 9 | 10 | 11 | 12 |
|---|---|---|---|---|---|---|---|
| Melam. Pentate, wt. % | 20.6 | 20.6 | 20.6 | 20.6 | 20.6 | 20.6 | 20.6 |

Notes:
(1)Polypropylene homopolymer, note 1, Table I.
(2)See note 3, Table I.

TABLE III

| | Flammability Properties, UL 94 Test, ⅛" Bars | | | | | | | | | | | |
|---|---|---|---|---|---|---|---|---|---|---|---|---|
| Example Numbers | 1 | 2 | 3 | 4 | 5 | 6 | 7 | 8 | 9 | 10 | 11 | 12 |
| Rating | NSE | V-0 | V-0 | V-0 | V-0 | V-0 | V-0 | V-0 | V-1 | V-0 | V-0 | V-0 |
| Ave. burn time, sec. | — | 1.0 | 1.6 | 2.5 | 2.9 | 1.4 | 1.2 | 1.6 | 6.0 | 1.0 | 1.1 | 1.8 |
| Max. burn time, sec. | 30+ | 1.0 | 5 | 7 | 9 | 5 | 3 | 7 | 27 | — | 2 | 7 |

The compounding of Examples 1-5, Table I was carried out by first dry-mixing the additive components with the powdered polypropylene then extruding the mixture using a 28 mm twin screw extruder with barrel temperatures of 360°-370° F., a die temperature of 385°-400° F. and screw speed of 270 rpm. The extrudate was chopped into pellets. The resin compositions were then injection molded on a 3 oz Van Dorn, employing a stock temperature of 420° F., to form tensile bars, discs and flammability test bars. The compounding of Examples 6-12, Table II and Examples 13-18, Table IV, was carried out by first dry-mixing the additive components with the powdered polypropylene, then mixing in a Brabender mixing head at 175°-190° C. for one minute at 40 rpm, then for four minutes at 60 rpm. The mass was removed from the Brabender, hand-pressed between plates to form a ⅜" slab, then compression-molded at 340° F. to form ⅛" thick slabs. Test bars were cut from the compression molded slabs and conditioned at 73° F., 50% r.h. for 24 hours prior to flammability testing. The test data for the various compositions are summarized in Tables III and IV.

TABLE I

| Example Numbers | 1 | 2 | 3 | 4 | 5 |
|---|---|---|---|---|---|
| Polypropylene | 100(1) | 100(1) | 100(2) | 100(2) | 100(2) |
| Melammonium Pentate | — | 25 | 30 | 25 | 25 |
| Pentaerythritol | — | — | — | 5 | — |
| Dipentaerythritol | — | 5 | — | — | 5 |
| DSTDP(3) | 0.2 | 0.2 | — | — | — |
| Irganox 1010(3) | 0.1 | 0.1 | — | — | — |
| BHT(3) | 0.05 | 0.05 | — | — | — |
| Calcium Stearate | 0.05 | 0.05 | — | — | — |
| Melam. Pentate, wt. % | 0 | 19.2 | 23 | 19.2 | 19.2 |

Notes:
(1)Polypropylene homopolymer, obtained as Profax 6501 from Hercules Chemical Co.
(2)Polypropylene homopolymer obtained as Profax 6523 from Hercules Chemical Co.
(3)DSTDP = distearyl thiodipropionate; Irganox 1010 = antioxidant from Ciba-Geigy Corp; BHT = butylated hydroxytoluene.

TABLE II

| Example Numbers | 6 | 7 | 8 | 9 | 10 | 11 | 12 |
|---|---|---|---|---|---|---|---|
| Polypropylene(1) | 100 | 100 | 100 | 100 | 100 | 100 | 100 |
| Melammonium Pentate | 27 | 27 | 27 | 27 | 27 | 27 | 27 |
| Inositol | 3 | — | — | — | — | — | — |
| Adonitol | — | 3 | — | — | — | — | — |
| L-(-)Arabitol | — | — | 3 | — | — | — | — |
| Dulcitol | — | — | — | 3 | — | — | — |
| Dipentaerythritol | — | — | — | — | 3 | — | — |
| Tripentaerythritol | — | — | — | — | — | 3 | — |
| N-methyl glucamine | — | — | — | — | — | — | 3 |
| DSTDP(2) | 0.2 | 0.2 | 0.2 | 0.2 | 0.2 | 0.2 | 0.2 |
| Irganox 1010(2) | 0.1 | 0.1 | 0.1 | 0.1 | 0.1 | 0.1 | 0.1 |
| Calcium Stearate | 0.75 | 0.75 | 0.75 | 0.75 | 0.75 | 0.75 | 0.75 |

It will be apparent that a propylene homopolymer is made flame retardant by the addition of as little as 23 wt% melammonium pentate (compare Example 1 with Example 3).

The addition of a polyhydric alcohol improved the intumescent and char-forming behavior of the composition, permitting the use of a lowered level of pentate salt to obtain a V-0 rating (see Examples 2 and 4-12).

Not all polyhydric alcohol are equally effective. Dulcitol (Example 9) does enhance the char-forming action, although the sample achieved only a V-1 rating. Similarly, compositions prepared according to Examples 6-12 but incorporating variously cellobiose, Salicin and maltotriose were not self-extinguishing, although some increase in intumescent behavior was seen.

TABLE IV

| Example Numbers | 13 | 14 | 15 | 16 | 17 | 18 |
|---|---|---|---|---|---|---|
| Polypropylene(1) | 100 | 100 | 100 | 100 | 100 | 100 |
| Melammonium Pentate | 35 | 30 | 25 | 24 | 21 | 18 |
| Dipentaerythritol | — | — | — | 3 | 3 | 3 |
| DSTDP(2) | 0.2 | 0.2 | 0.2 | 0.2 | 0.2 | 0.2 |
| Irganox 1010(2) | 0.1 | 0.1 | 0.1 | 0.1 | 0.1 | 0.1 |
| Calcium Stearate | 0.75 | 0.75 | 0.75 | 0.75 | 0.75 | 0.75 |
| Melam. Pentate, wt. % | 25.9 | 23.9 | 19.8 | 18.7 | 16.7 | 14.8 |
| Flammability Properties, UL 94 Test, ⅛" Bars | | | | | | |
| Rating | V-0 | NSE | NSE | V-0 | V-0 | V-1 |
| Ave. burn time, sec. | 2.0 | — | — | 1.5 | 2.5 | 8.6 |
| Max. burn time, sec. | 8 | — | — | 6 | 10 | 19 |

Notes:
(1)See note 1, Table I.
(2)See note 3, Table I.

Batch-to-batch variations in quality of the amino-s-triazine have resulted in some variation in flame retardant behavior for reasons that are not at all understood. In Example 3, Table I, 23 wt.% of melammonium pentate resulted in a V-0, self-extinguishing polypropylene composition. A subsequent preparation of melammonium pentate, when compounded at levels of 25.9, 23.9 and 19.8 wt.%, produced V-0, self extinguishing compositions only at the highest level. See Examples 13-15, Table IV. The addition of a polyhydric alcohol to these latter compositions, however, resulted in V-0, self-extinguishing compositions at substantially reduced melammonium pentate levels, as shown in Examples 16 and 17, and in a V-1 composition at a level of 14.8 wt.% melammonium pentate.

Improved intumescent behavior and flame retardant character was also noted upon the addition of high molecular weight polyhydric alcohols in the form of starches.

Example 19. A composition was prepared and molded as in Example 6, but employing 3 parts by weight amylose in place of the inositol. The composition had a flammability rating of V-1 upon testing, with an average burn time of 3.7 sec and a maximum burn time of 25 sec.

Example 20. A composition was prepared and molded as in Example 6, but employing 3 parts by weight xylan in place of the inositol. The composition had a flammability rating of V-1 upon testing, with an average burn time of 3.1 sec and a maximum burn time of 11 sec.

Further modifications including the use of dyes, pigments, fillers, stabilizers and the like will be apparent to those skilled in the art, and such additives and modifications may be made without departing from the spirit and scope of the invention, which is defined solely by the following claims.

The invention will thus be seen to be compositions comprising a polyolefin, a pentate salt of an amino-s-triazine and a polyhydric alcohol, wherein the amount of said pentate salt will be from about 14 to about 50 wt.% of the total composition and wherein the weight ratio of said pentate salt to said polyhydric alcohol will be from about 10:1 to about 4:1.

I claim:

1. Polyolefin compositions comprising a polyolefin, an intumescent flame retardant additive selected from the group consisting of melammonium pentate, the pentate salt of ammelide, and mixtures thereof, and a polyhydric alcohol.

2. The composition of claim 1 wherein the polyhydric alcohol is selected from the group consisting of pentaerythritol, dipentaerythritol, tripentaerythritol, pentitols, and hexitols and mixtures thereof.

3. The composition of claim 1 wherein the polyhydric alcohol is selected from the group consisting of pentaerythritol, dipentaerythritol, and tripentaerythritol and mixtures thereof.

4. The composition of claim 1 wherein the polyhydric alcohol is selected from the group consisting of inositol, adonitol, arabitol, dulcitol, N-methylglucamine, amylose, xylan and mixtures thereof.

5. The composition of claim 1 wherein the intumescent flame retardant additive is present in from about 15 to about 40 percent by weight of the total composition, and wherein the weight ratio of intumescent flame retardant additive to polyhydric alcohol is in the range 10:1 to 4:1.

6. The composition of claim 1 wherein the polyolefin is selected from the group consisting of polypropylene, polyethylene and copolymers thereof.

7. The composition of claim 1 wherein said additive is melammonium pentate.

8. The composition of claim 1 wherein said additive is the pentate salt of ammelide.

9. An intumescent composition adapted to render polyolefins flame retardant comprising a pentate salt of an amino-s-triazine and a polyhydric alcohol.

10. The composition of claim 9 wherein the pentate salt of an amino-s-triazine and the polyhydric alcohol are present in a weight ratio of from about 10:1 to about 4:1.

11. The composition of claim 9 wherein the pentate salt of an amino-s-triazine is selected from the group consisting of melammonium pentate, the pentate salt of ammelide and mixtures thereof.

12. The composition of claim 9 wherein the polyhydric alcohol is selected from the group consisting of pentaerythritol, dipentaerythritol, tripentaerythritol, pentitols, and hexitols and mixtures thereof.

13. The composition of claim 9 wherein the polyhydric alcohol is selected from the group consisting of pentaerythritol, dipentaerythritol, and tripentaerythritol and mixtures thereof.

14. The composition of claim 9 wherein the polyhydric alcohol is selected from the group consisting of inositol, adonitol, arabitol, dulcitol, N-methylglucamine, amylose, xylan and mixtures thereof.

* * * * *